US008550821B2

(12) United States Patent
Illana Alejandro et al.

(10) Patent No.: US 8,550,821 B2
(45) Date of Patent: Oct. 8, 2013

(54) SIMULATION SYSTEM FOR ARTHROSCOPIC SURGERY TRAINING

(75) Inventors: Carlos G. Illana Alejandro, Tres Cantos (ES); Bernardo Sierra Picon, Tres Cantos (ES); Juan Vercher Martinez, Tres Cantos (ES); Samuel Rodriguez Bescos, Tres Cantos (ES); Manlio Favio Valdiviesco Casique, Tres Cantos (ES); Francisco Javier Ananos Hinojosa, Tres Cantos (ES); Jorge Potti Cuervo, Tres Cantos (ES); Almudena Sanchez Gonzalez, Tres Cantos (ES); Luis Pastor Pérez, Móstoles (ES); José Mañuel Fernandez-Arroyo, Móstoles (ES); Gracián Triviño Barros, Móstoles (ES); Ángel Rodríguez Bartolomé, Móstoles (ES); José Miguel Guillermo, Móstoles (ES); Sofia Bayona Beriso, Móstoles (ES); Marcos José Garcia Lorenzo, Móstoles (ES); Pablo Tohario Rabasco, Móstoles (ES); José Javier San Martin Lopez, Móstoles (ES); Oscar David Robles Sánchez, Móstoles (ES); César Augusto Mendoza Serrano, Móstoles (ES)

(73) Assignee: Simbionix Ltd., Airport City (IL)

( * ) Notice: Subject to any disclaimer, the term of this patent is extended or adjusted under 35 U.S.C. 154(b) by 885 days.

(21) Appl. No.: 12/527,109
(22) PCT Filed: Feb. 14, 2007
(86) PCT No.: PCT/ES2007/000082
  § 371 (c)(1),
  (2), (4) Date: Dec. 7, 2009
(87) PCT Pub. No.: WO2008/099028
  PCT Pub. Date: Aug. 21, 2008

(65) Prior Publication Data
  US 2010/0086905 A1  Apr. 8, 2010

(51) Int. Cl.
  *G09B 23/28* (2006.01)

(52) U.S. Cl.
  USPC .......................... 434/267; 434/262; 434/274

(58) Field of Classification Search
  USPC ................... 434/262, 267, 272, 274; 606/87, 606/88
  See application file for complete search history.

(56) References Cited

U.S. PATENT DOCUMENTS

| | | | |
|---|---|---|---|
| 4,605,373 | A | 8/1986 | Rosen |
| 2005/0142525 | A1 | 6/2005 | Cotin et al. |
| 2007/0212674 | A1 | 9/2007 | Spiers |

FOREIGN PATENT DOCUMENTS

| | | |
|---|---|---|
| EP | 1 205 295 | 5/2002 |
| WO | WO 97/33263 A1 | 9/1997 |

(Continued)

OTHER PUBLICATIONS http://web.archive.org/web/20060830070030/www.sensable.com/products/phantom_g Oct. 26, 2007.

(Continued)

*Primary Examiner* — Bruk Gebremichael
(74) *Attorney, Agent, or Firm* — Pearl Cohen Zedek Latzer, LLP

(57) ABSTRACT

The invention relates to a simulator for training in arthroscopic surgery on a joint of a simulated patient, comprising: a data processing unit (1); viewing means (2) for viewing the simulation exercise; a working platform (12); a human anatomy model (9) with arthroscopic portals (3) through which the user inserts the simulated arthroscopic instrument (10); two haptic devices (5a, 5b) arranged around the model (9) with a mobile member (6a, 6b), the end of which is provided with a guide (8a, 8b) for guiding the instrument that is inserted into the arthroscopic portals (3) during a simulated surgical procedure, each haptic device (5a, 5b) including means for synchronization with the control unit (1) and means for determining the position and orientation of the mobile members (6a, 6b); and a simulated arthroscopic camera (7). The data processing unit (1) is configured to send simulated images, as would be seen in a real operation, from the arthroscopic camera (7) to the viewing means (2) in real time.

8 Claims, 5 Drawing Sheets

(56) References Cited

FOREIGN PATENT DOCUMENTS

| WO | WO 99/42978 | 8/1999 |
|---|---|---|
| WO | WO 03/001483 | 1/2003 |
| WO | WO 03/096307 | 11/2003 |
| WO | WO 2004/064010 A2 | 7/2004 |

OTHER PUBLICATIONS http://web.archive.org/web/20061016081307/www.immersion.com/medical/products Oct. 26, 2007.

International Search Report for PCT application PCT/ES2007/00008 dated Oct. 31, 2007.

Written Opinion of the International Search Authority for PCT application PCT/ES2007/00008 dated Oct. 31, 2007.

Response to Written Opinion of the International Search Authority for PCT application PCT/ES2007/00008 dated Dec. 9, 2008.

A McCarthy et al "Passive Haptics in a Knee Arthroscopy Simulator, Is it Valid for Core Skills Training? " Clinical Orthopedics and Related Search, 442:13-20 (2006).

I.P. Logal et al. "Virtual Environment Knee Arthroscopy Training System", *Simulation for Emergency Management*. Proceedings of the 1996 Simulation Multiconference, pp. 11-16 1996).

S. Gibson et al. "Simulating Arthroscopy Knee Surgery Using Volumetric Object Representations , Real-Time Volume Rendering and Haptic Feed back", *CVR Med-MRCAS '97 First Joint Conference, Computer Vision, Virtual Reality and Robotics in Medicine and Medical Robotics and Computer-Assisted Surgery Proceedings*, pp. 369-378 (1997).

"Virtual Reality Arthroscopy Trainer. Technological Innovation for Minimally Invasive Surgery Training", *GMV Innovating Solutions*, (2008).

SIMULATION SYSTEM FOR ARTHROSCOPIC SURGERY TRAINING

This application is a National Stage Application of PCT/ES2007/000082, filed 14 Feb. 2007 and which application is incorporated herein by reference. To the extent appropriate, a claim of priority is made to the above disclosed applications

FIELD OF THE INVENTION

The present invention is comprised in simulation techniques applied to the surgery training field, specifically for surgical operations on joints, also referred to as arthroscopies or arthroscopic surgeries, for the purpose of initiating, training and teaching surgeons, enabling the improvement of arthroscopic surgical techniques and practicing new procedures that are developed in the evolution and improvement of surgical practice.

BACKGROUND OF THE INVENTION

Simulators in the field of the medicine are not well known today. Several years ago simulators which could be described as static were disclosed, in which only the patient, or an area thereof, is represented by means of a mannequin.

The simulation system object of the present invention provides a considerable number of advantages, since on one hand it physically reproduces the surgical instrument (arthroscopic camera and arthroscopic instrument), it reproduces the surface anatomy of the area in question (shoulder, knee, etc.) by means of a 1:1 scale plastic structure of real anatomical models and based on specifically designed virtual reality techniques, it provides normal and pathological anatomical images similar to those provided by real models.

The specifically developed simulation system combines the use of the simulated surgical instrument acting inside the plastic structure, generating virtual anatomical images, providing a feel for handling the instrument, simulating surgical arthroscopy.

This system has a series of arthroscopic exercises of increasing complexity, based on the learning protocols used in arthroscopic courses which allow assessing both the correct performance of the exercise, and the progression and improvement in arthroscopic training, allowing the repetition of said exercises and self-evaluation. The present invention replaces, in a very reliable and optimal manner in terms of availability and costs, practicing with cadavers as a learning element.

The proposed arthroscopic surgery trainer is a set of devices formed by a) a central unit, usually a computer, the function of which consists of controlling and managing all the devices in charge of representing images and touch, as well as collecting the data of the functions performed by the user, simulating a real operation; b) a display or monitor, where the images that the doctor sees are displayed, c) a working platform simulating the operating room containing: the human anatomy to be simulated (this anatomy being interchangeable, according to the simulation exercises to be practiced); and d) the haptic devices in charge of reproducing the feel of the instrument used in the simulated procedure.

DESCRIPTION OF THE INVENTION

The invention relates to a simulation system for arthroscopic surgery training according to claim 1. Preferred embodiments of the system are defined in the dependent claims.

The system object of the invention simulates a surgical procedure performed by a user of the system on a specific joint of a simulated patient. The system comprises:
- at least one data processing unit;
- a working platform;
- a human anatomy model arranged on the working platform, and representing the anatomical surface of the joint on which the operation is to be simulated in real size, said human anatomy model being provided with a plurality of openings corresponding to the arthroscopic portals through which the user inserts the simulated arthroscopic instrument in the joint during the simulated surgical procedure;
- at least two working devices arranged in the working platform around the human anatomy model, each of them being provided with at least one mobile member the end of which is provided with a guide for guiding the instrument that is inserted into the arthroscopic portals during the simulated surgical procedure, said at least one mobile member being provided with fixing means for fixing the arthroscopic instruments used in the arthroscopy, each working device being provided with means for synchronization with the control unit and with means for determining the position and orientation of its mobile members;
- the simulated arthroscopic instrument used during the simulated surgical procedure, said instrument comprising at least one arthroscopic instrument fixed to one of the two mobile members of the working devices through its corresponding fixing means;
- a simulated arthroscopic camera fixed to any one of the mobile members of the working devices through its corresponding fixing means; and
- viewing means for viewing the simulation exercise, in charge of viewing the images sent by at least one data processing unit.

In the present system at least one data processing unit is configured:
- to acquire and to process a first group of data relating to the position of the arthroscopic portals, and to extract from said first group of data a first group of position coordinates of said arthroscopic portals;
- to acquire and to process a second group of data relating to the position and orientation of the mobile members of each working device, and to extract from said second group of data a second group of position coordinates and direction vectors of each arthroscopic instrument used during a simulated surgical procedure;
- to process the information received and to send information in the form of images representing the simulated view of the internal anatomy of the joint and of the instrument inserted therein, which is obtained from the arthroscopic camera (7) depending on the position and orientation of the latter inside the joint, as would be seen in a real operation, to the viewing means (2) in real time.

The working platform is preferably provided with at least one guide on which the working devices move to facilitate access of the instrument to the arthroscopic portals, said working devices being provided with means for determining their position, and at least one control unit being configured to acquire and to process a third group of data relating to the position of the working devices and to extract from said third group of data a third group of position coordinates of said working devices.

The working devices are preferably each fixed to a mobile base in turn attached to arms integrally joined at their ends to shafts. To determine the position of the working devices, inserted in the center of the shafts there can be a plurality of encoder discs, there being as many of the latter as there are arms and each of them with an optical sensor, such that the movement of each working device generates a radial movement of the corresponding encoder disc, said movement being detected by the corresponding optical sensor connected to an electronic circuit calculating the position of the working devices, and sending said position to the data processing unit.

The working devices are preferably haptic devices provided with means for generating a force on the mobile members. At least one data processing unit calculates the position of the instruments inserted inside the joint with regard to the position of the simulated anatomical components of said joint and sends, in the event that it considers an arthroscopic instrument will collide with any of said anatomical components, information relating to said collision to the haptic device to which the instrument causing the collision is fixed, said haptic device generating a force in the mobile member to simulate, and to inform the active user of the collision in the simulation exercise, giving the user a sensation of touching the different anatomical structures.

The simulated arthroscopic instrument can comprise at least one of the following simulated arthroscopic instruments: probe, vaporizer, drill, bur, synoviotome, arthroscopic forceps, arthroscopic scissors. The arthroscopic forceps and the arthroscopic scissors can incorporate manually operated levers the movement of which is recorded by an electronic system and sent to at least one data processing unit which is in charge of representing the respective functions of said instruments in the viewing means.

The simulated arthroscopic camera is preferably provided with:
an optic that can freely rotate with regard to the camera;
means for detecting and measuring the rotation of the optic with regard to the camera, which transmit the information relating to the rotation of the optic to the at least one data processing unit; and optionally
at least one button to direct graphic functions represented in the viewing means;

In this case, the data processing unit represents in the viewing means a rotation of the same angular magnitude in the virtual image of the simulated exercise which is being represented therein.

The working platform is preferably provided on its upper face with a support for the anatomical model in which the human anatomy model is coupled.

The system can additionally comprise a pedal incorporating foot-operated switches to control at least one of the following arthroscopic instruments: the arthroscopic motor (either a bur or synoviotome), the vaporizer.

The present simulation system can incorporate the adaptation of the didactic learning sequence using automatic methods according to the results of the sessions of each user, and with configurable evaluation criteria. In turn, it can incorporate a set of expandable exercises in its didactic sequence. It also preferably and fully incorporates the movements of the actual arthroscopic camera and a precise anatomical modeling of the arthroscopic view.

The present simulation system has the following advantages:
It allows learning spatial and psychomotor skills, covering the void existing between theory and direct practice in patients, and it enables continuous training and improvement in said skills.
Realistic simulation based on the haptic devices, accuracy of the anatomical models, viewing in real time of the movements, instrument (camera, probe) models and ergonomic topics due to the haptic devices being mobile on rails or guides.
Articulated anatomical models according to real measurements which enable understanding the anatomical references and allow reproducing the same gestures as in surgery.
The same working platform is applicable to different joints (shoulder, knee, etc).
The didactic sequence includes not only practicing a simulated surgical procedure, but also exercises for handling the camera, which enables understanding the movements of the camera and exercises to practice handling different arthroscopic instruments, such as the probe.
The graphic interface is intuitive and therefore easy to learn.
It allows being trained in extreme or rather uncommon situations.
The reproducibility (recovery for analysis) of the sessions enables self-directed learning.
The evaluation criteria are configurable, which is a very flexible feature while at the same time providing objectivity in the evaluation.
It allows multiplying low-cost training possibilities compared to courses with cadavers and with no ethical restrictions which could be involved in practicing with animals.
It allows validating instrument designs and validating new surgical procedures.
It does not require specialized personnel for use nor special installations.

BRIEF DESCRIPTION OF THE DRAWINGS

A series of drawings/figures/diagrams which aid in better understanding the invention and which are expressly related to an embodiment of said invention, presented as a non-limiting example thereof, is very briefly described below. Said drawings show the practical embodiment of a surgery simulator for arthroscopic surgery (which shall hereinafter be referred to as a surgery simulator).

DESCRIPTION OF A PREFERRED EMBODIMENT OF THE INVENTION

Figure 1:
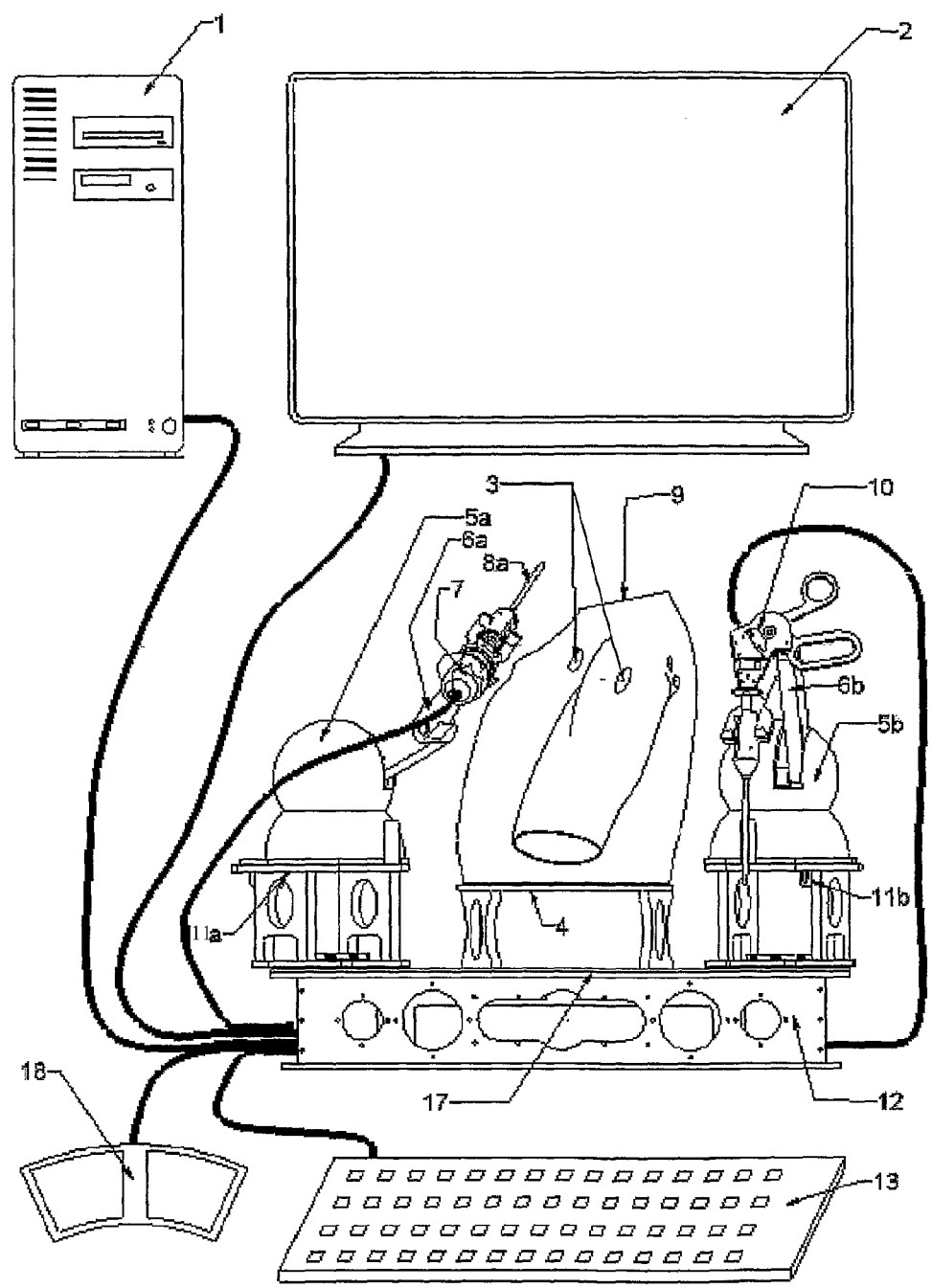
FIG. 1 depicts the modular system and the electrical wiring making up the surgery simulator, using as an example an anatomical model based on a shoulder section.
Figure 2:
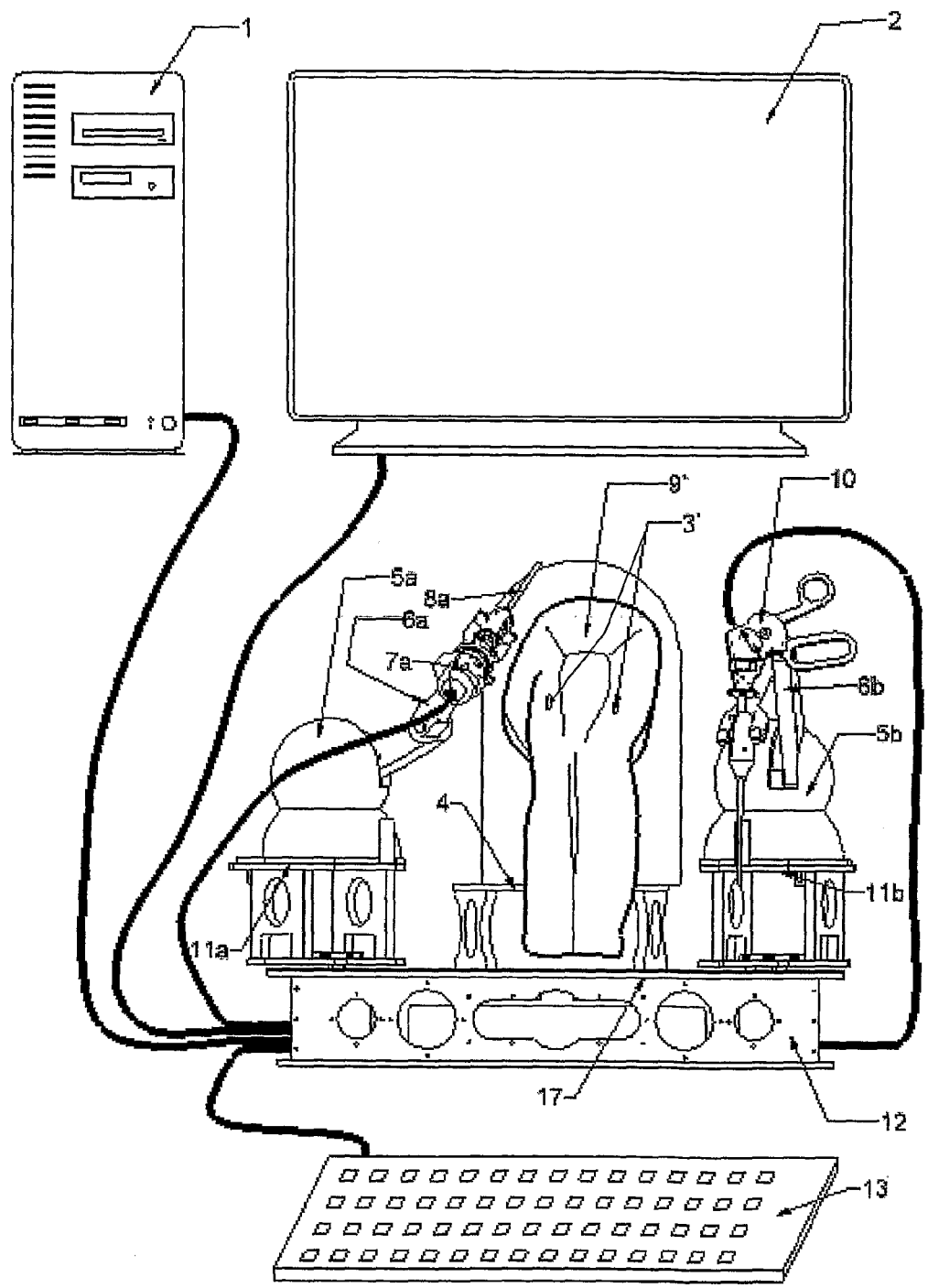
FIG. 2 is similar to FIG. 1, but it uses an anatomical section of a leg as a referent for the simulation, whereby in this case arthroscopic knee surgery operations will be simulated, but operations on other anatomical areas such as the shoulder, pelvis, etc., could also be performed
Figure 3:
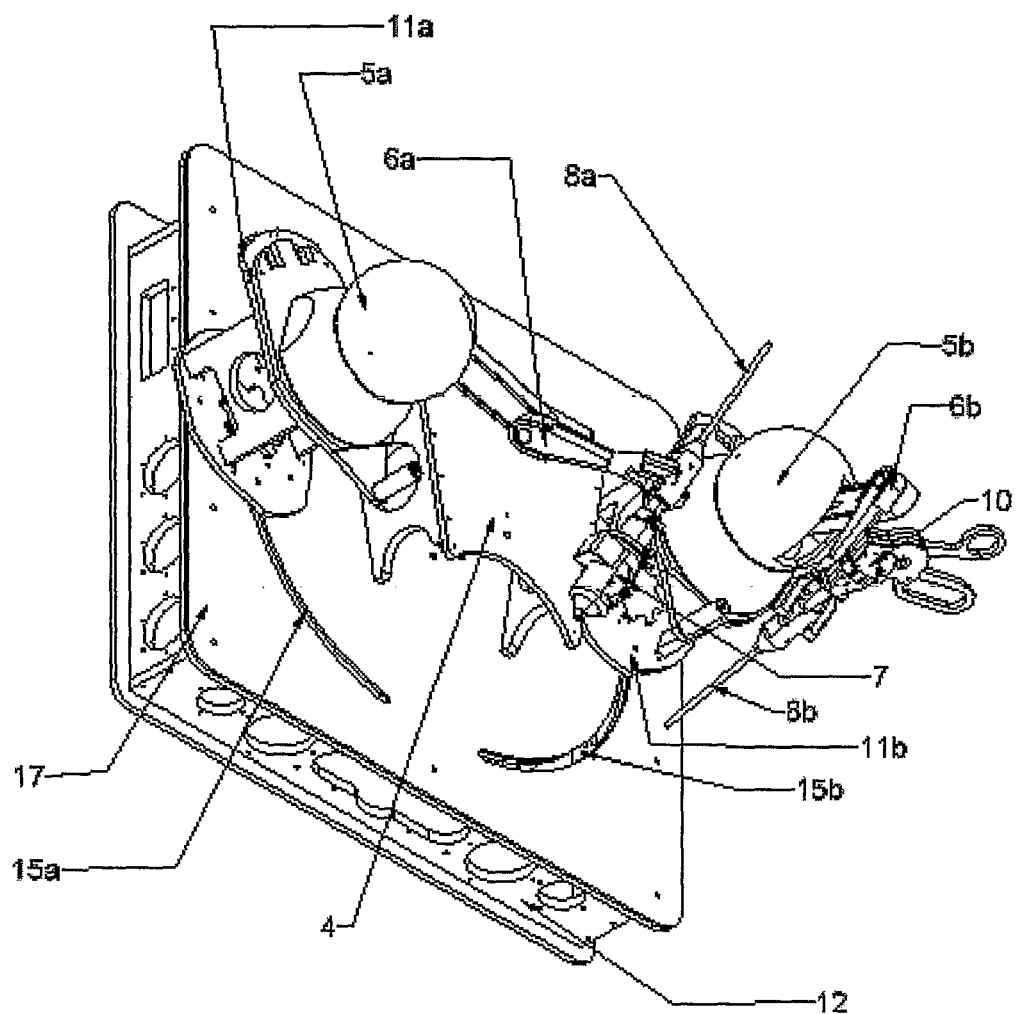
FIG. 3 depicts a perspective view of the working platform on which the simulated surgical procedure is performed, in which the anatomical model is not assembled.
Figure 4:
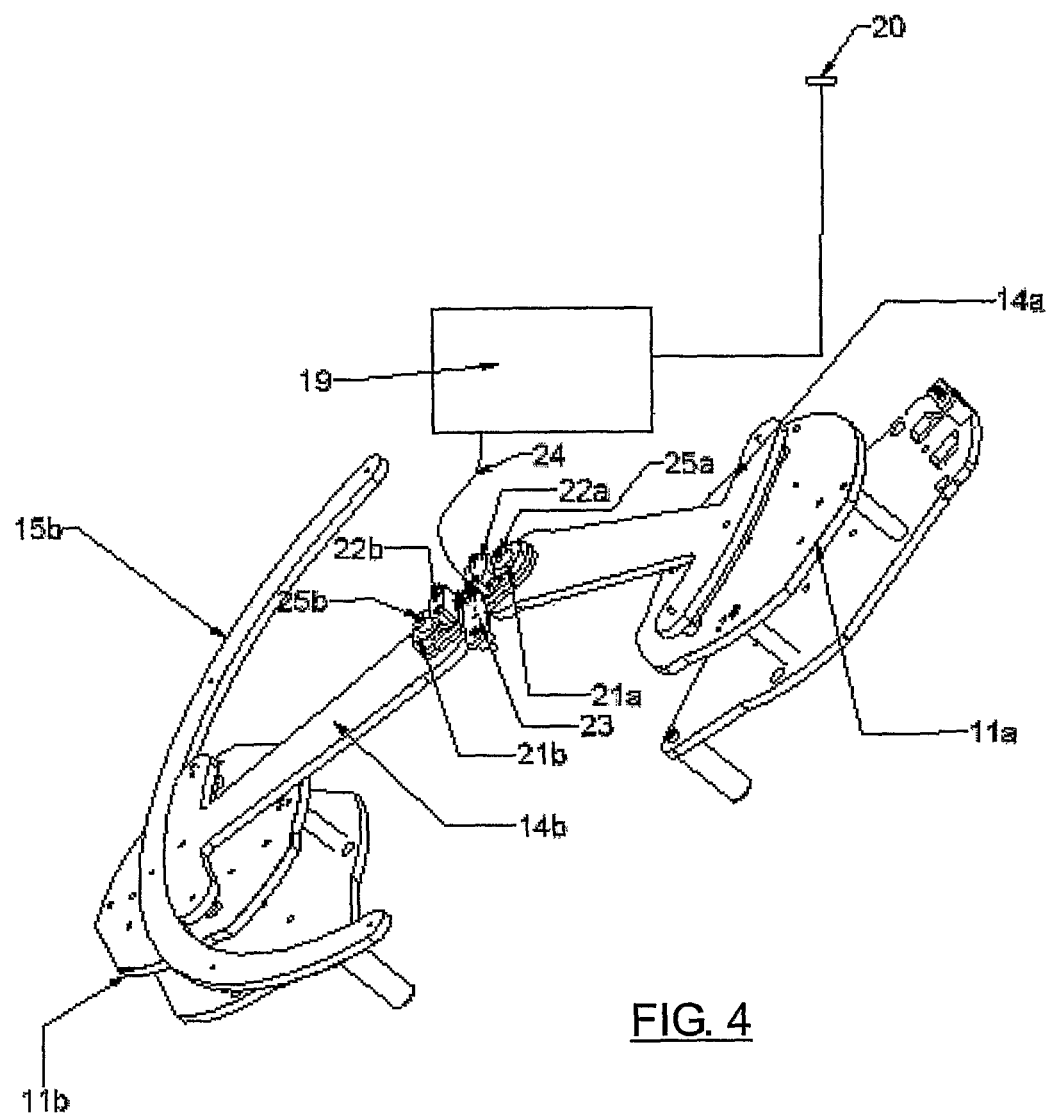
FIG. 4 shows the joint and movement system of the simulator touch devices, the haptic devices.

The surgery simulator for arthroscopic surgery consists, as shown in FIGS. 1 and 2, of a working platform 12 performing the functions of support and guide for the physical and mechanical elements; the inner part of the platform 12 carries out the function of a container for housing auxiliary circuitry, such as the electronic circuit 19, shown in FIG. 4, for example, which is in charge of receiving and processing the information from different encoders. The system further comprises a data processing unit 1 which runs a computer program specifically developed for this simulation, and which is in charge of managing control of the system and representing the images in viewing means 2, such as for example a monitor with a touch screen. The support 4 for the anatomical model is located on the upper face 17 of the working platform 12, on which support the human anatomy model (9,9') or any other model that can be used in simulation training exercises for arthroscopic surgery is arranged. Said models (9,9') are preferably made of considerably non-deformable but resistant plastic with a hollow structure. The working platform is shown in detail and in perspective in FIG. 3.

It is possible to interact with the simulation system through the data input means, such as a keyboard 13, being able to choose for example the simulation program to be run, to indicate the human anatomy model (9,9') that is specifically being used (shoulder 9, knee 9', etc.), to configure the different parameters of the simulation exercise such as the difficulty of the exercise. It is also possible to interact with the simulation system through, for example, the viewing means 2, in the case of a monitor with a touch screen for example. The pedal 18 shown in FIG. 1 incorporates foot-operated switches similar to those used in real arthroscopy to control the arthroscopic motor, the vaporizer or the electrosurgical unit, etc.

The working devices (5a,5b) are, in this particular embodiment, haptic devices at the ends of the arms (6a,6b) of which a guide (8a,8b) is incorporated for guiding the instrument that is inserted into the anatomical model (9,9') through the penetration openings called arthroscopic portals (3,3'); the instrument 10 or the camera 7, whichever appropriate, is housed at the opposite end of said guide (8a,8b) for guiding the instrument. The haptic devices (5a,5b) perform the function of transmitting to the sense of touch of the user of the system sensations of force, hardness, rugosity, elasticity and vibrations. For example, it transmits to the hand a sensation of contact (the hardness, rugosity, shape or edge) with a bone structure; it transmits the elasticity of a muscle, tendon, ligament, artery or vessel, and even simulates pathologies as if the patient were real. The friction and vibrations produced by the instrument 10 are also reproduced by said haptic devices (5a,5b).

The haptic devices (5a,5b) are fixed to the mobile bases (11a,11b) respectively, such that the latter are attached to arms (14a,14b) in correspondence therewith, as shown in FIG. 4, and the arms are integrally attached at their ends to the shaft 25a, 25b. The user handles the arthroscopic camera 7 assembled in one of the haptic devices with one hand and the simulated arthroscopic instrument 10 assembled in the other haptic device with the other hand such that the haptic devices slide, by means of their respective mobile bases (11a,11b), along the respective guides (15a,15b). To determine the position of the working devices (5a,5b), inserted in the center of the shafts (25a, 25b) there are a plurality of encoder discs (21a,21b), both assembled on an encoder support 23, such that any movement of a haptic device (5a,5b) translates into radial movement of the corresponding encoder disc, the movement of which is detected by an optical sensor (22a, 22b), the position is recorded by the electronic circuit 19 through the cable 24, and the result of the position is sent to the data processing unit 1, through a connector 20, to determine the coordinates of the haptic devices in their virtual scenario and to enable calibrating the system.

Figure 5:
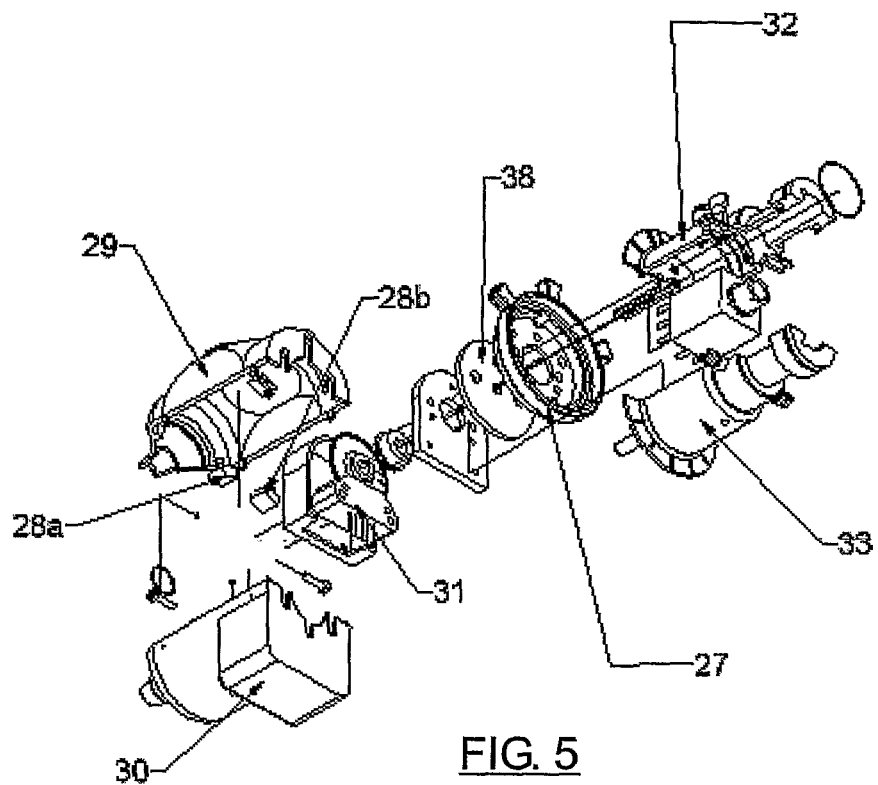
FIGS. 5 and 6 respectively show an exploded view of the arthroscopic camera and the arthroscopic camera with its components assembled.
Figure 6:
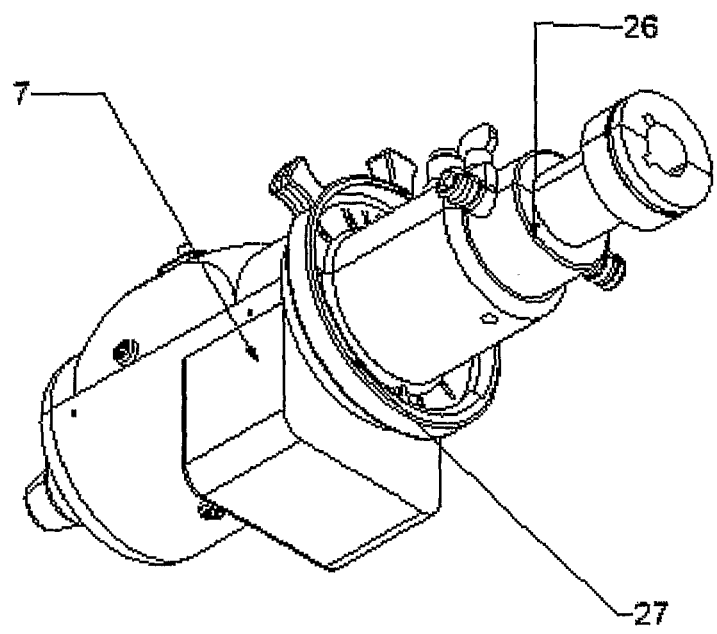

The system also comprises a reproduction of an arthroscopic camera 7, a device which can be coupled to any one of the arms (6a,6b) performing the simulation functions of an actual arthroscopic camera used in surgery, also referred to as arthroscopy. As shown in FIGS. 5 and 6, the arthroscopic camera 7 is made up of a set of parts, the functions of which are explained below. The camera 7 is made up of an upper body 29 along with a lower body 30 and integral thereto there is a ring 27 the function of which consists of coupling the lens 26 formed by the upper casing 32 and the lower casing 33, both being integral to one another, so that the lens 26 can freely rotate with regard to the camera 7; this rotation is detected and measured by an optical sensor 31, which information is transmitted to the control unit 1, which will produce a rotation of the same angular magnitude in the virtual image which is being represented in the monitor 2. The brake disc 38 creates resistance to the rotation of the lens 26 with such a value that the lens does not fortuitously rotate, only if it is manually operated. If the camera 7 remains blocked (it does not rotate) while the lens 26 is rotated, an orbital translation of the image is shown in the monitor 2 if the simulated lens is angled like the lenses generally used in arthroscopic surgery are, simulating the rotations of the arthroscopy and optic like in real practice.

The left button of the camera 28b serves to select the operating mode of the buttons. This mode can be, among others, switching to an arthroscopic or external image, or switching to zoom mode. In zoom mode, the left button 28b will perform the functions of moving away and the right button 28a the functions of moving closer.

The instrument 10, which can be interchangeable, is a model that imitates the real instrument, simulating, among others, the following surgical instruments: probe, vaporizer, drill, bur, synoviotome, arthroscopic forceps, arthroscopic scissors, etc. The latter two simulated instruments incorporate manually operated levers, the movement of which is recorded by an electronic system to be sent to the data processing unit 1, representing the functions of the instrument 10 in virtual reality.

The invention claimed is:
1. A simulation system for arthroscopic surgery training, wherein a surgical procedure is simulated by a user of the system the system comprising:
   at least one data processing unit;
   one or more simulated arthroscopic instruments;
   a simulated arthroscopic camera;
   a working platform provided with at least one platform guide;
   a human anatomy model arranged on the working platform and representing a joint on which the surgical procedure is being simulated in real size, said human anatomy model being provided with a plurality of openings corresponding to arthroscopic portals through which the user inserts the simulated arthroscopic instrument into the joint during the simulated surgical procedure;
   at least two working devices arranged in the working platform around the human anatomy model, each being provided with at least one mobile member, the end of which is provided with an instrument guide for guiding one of the simulated arthroscopic instruments that is inserted into one of the arthroscopic portals during the simulated surgical procedure; and
   a monitor to present images sent by the at least one data processing unit in relation to the simulated surgical procedure,
wherein at least one of the simulated arthroscopic instruments used during the simulated surgical procedure being fixed to one of the mobile members of the working devices;

wherein the simulated arthroscopic camera is fixed to one of the mobile members of the working devices; and wherein the at least one data processing unit is configured:

to acquire and to process a first group of data relating to the position of the arthroscopic portals, and to extract from said first group of data a first group of position coordinates of said arthroscopic portals;

to acquire and to process a second group of data relating to the position and orientation of the mobile members of the working devices, and to extract from said second group of data a second group of position coordinates and direction vectors of each of the arthroscopic instruments used during the simulated surgical procedure; and to process the information received and to send information to the monitor in real time, in the form of images representing simulated view of the internal anatomy of the joint and of the one or more instruments inserted therein, which is obtained from the arthroscopic camera depending on the position and orientation of the latter inside the joint, as would be seen in a real operation, wherein the working devices move on the at least one platform guide to facilitate access of the instrument to the arthroscopic portals, wherein said working devices being provided with encoder discs and optical sensors to determine position of the working devices, and the at least one data processing unit being configured to acquire and to process a third group of data relating to the position of the working devices and to extract from said third group of data a third group of position coordinates of said working devices; and wherein the working devices are each fixed to a mobile base, each mobile base is attached to one of two arms and the arms are integrally joined at their ends to shafts.

2. The system according to the claim 1, wherein to determine the position of the working devices, inserted in the center of the shafts are the encoder discs, there being as many of the latter as there are arms and each of them with a respective one of the optical sensors, such that the movement of each working device generates radial movement of the corresponding encoder disc, said movement being detected by the corresponding optical sensor connected to an electronic circuit calculating the position of the working devices, and sending said position to the at least one data processing unit.

3. The system according to claim 1, wherein the working devices are haptic devices that generate force on the mobile members, and the at least one data processing unit calculates the position of the simulated arthroscopic instruments inserted inside the joint with regard to the position of simulated anatomical components of said joint and sends, information relating to collision of one of the simulated arthroscopic instruments and one of the simulated anatomical components to one of the haptic devices to which the instrument causing the collision is fixed, said haptic device generating force in a corresponding mobile member to simulate and to inform the user of the collision, giving the user a sensation of touching different anatomical structures.

4. The system according to claim 1, wherein the simulated arthroscopic instruments comprises at least one of the following: probe, vaporizer, drill, bur, synoviotome, arthroscopic forceps, arthroscopic scissors.

5. The system according to claim 1, wherein an arthroscopic forceps and an arthroscopic scissors incorporate manually an operated lever, the movement of which is recorded by an electronic system and sent to at least one data processing unit which is in charge of representing respective functions of said instruments in the monitor.

6. The system according to claim 1, wherein the simulated arthroscopic camera is provided with:

an optic that freely rotates with regard to the camera;

an optical sensor for detecting and measuring the rotation of the optic with regard to the camera, wherein information relating to the rotation of the optic is transmitted to the at least one data processing unit; and at least one button to direct graphic functions represented in the monitor;

wherein the at least one data processing unit represents in the monitor a rotation of the same angular magnitude in a virtual image of the simulated procedure which is being represented on the monitor.

7. The system according to claim 1, wherein the working platform is provided on its upper face with a support for the anatomical model in which the human anatomy model is coupled.

8. The system according to claim 1, wherein the system additionally comprises a pedal incorporating foot-operated switches to control at least one of an arthroscopic motor and, a vaporizer.

* * * * *